Sept. 1, 1925.
M. SCHWARTZ
JOINT
Filed Dec. 10, 1923
1,551,625
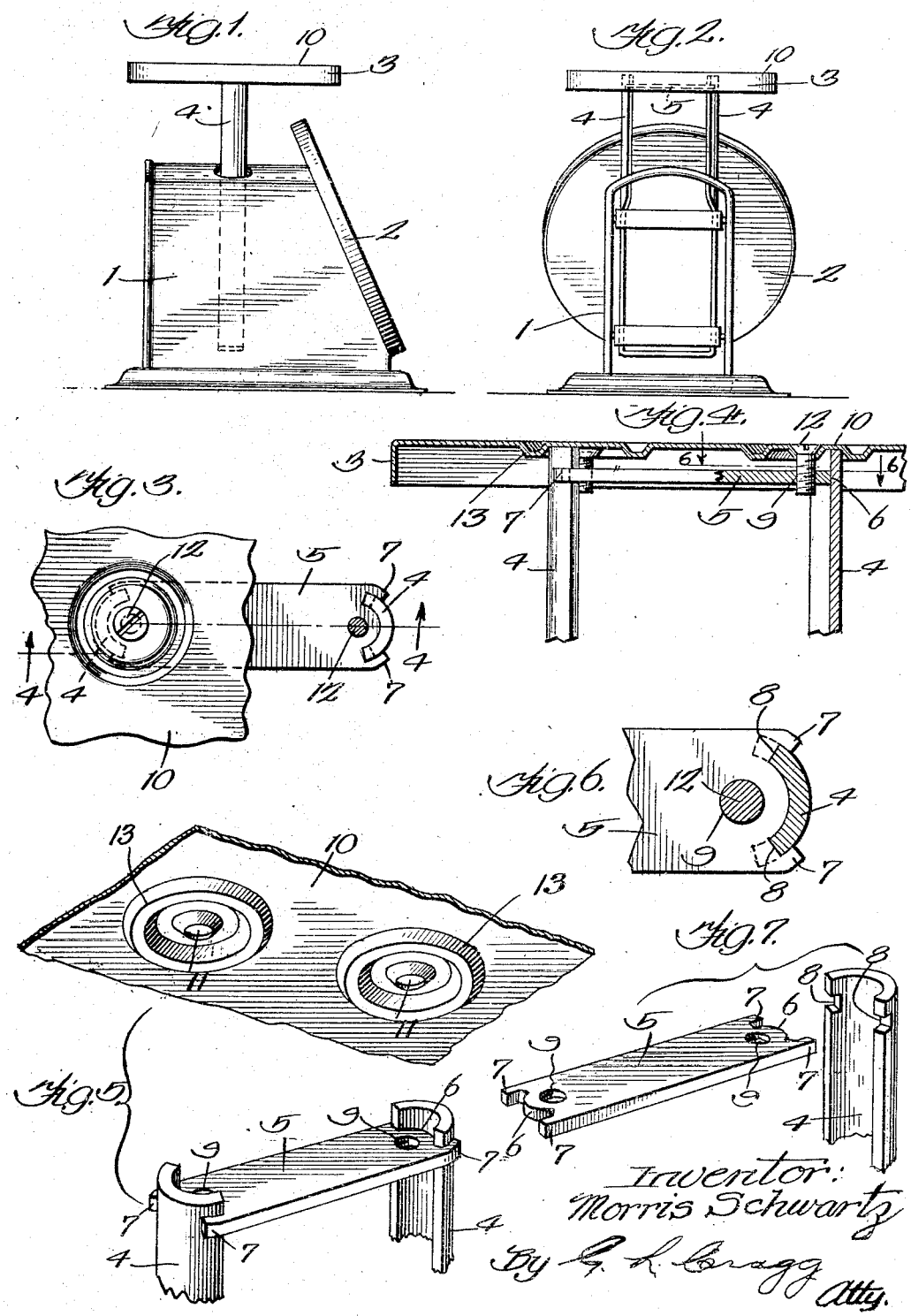

Patented Sept. 1, 1925.

1,551,625

UNITED STATES PATENT OFFICE.

MORRIS SCHWARTZ, OF CHICAGO, ILLINOIS, ASSIGNOR TO PEERLESS SCALE & MANUFACTURING COMPANY, OF CHICAGO, ILLINOIS, A CORPORATION OF ILLINOIS.

JOINT.

Application filed December 10, 1923. Serial No. 679,797.

*To all whom it may concern:*

Be it known that I, MORRIS SCHWARTZ, a citizen of the United States, residing at Chicago, in the county of Cook and State of Illinois, have invented a certain new and useful Improvement in Joints, of which the following is a full, clear, concise, and exact description.

My invention relates to the formation of joints and is of service in many structures. I have actually embodied my invention in supports for scale pans, such an embodiment of the invention including a U-shaped scale pan carrying member or support formed of strip metal and curved at its ends in transverse directions to make the support concave upon the inner opposing faces thereof and convex on the outer faces thereof. A second strip constitutes a strut between the sides of the U-shaped support, this second strip having a projection at each end received in the adjacent cavity of the support to which such projection conforms in shape. The second strip also has horns on each side of each end projection, these horns entering notches that are formed in the edge portions of the curved parts of the support. These horns are inwardly curled or bent over the convex surface of the support whereby the strut and support are clinched together.

The support also constitutes a positioner for the scale pan, the latter element being formed with ridges fitting the convex sides of the support. Holes are formed in the scale pan and strut at the ends of the strut and within the ridges and concave sides of the support, these holes receiving screws or other fastening members whereby the scale pan is assembled with the support and the strut. While the support is preferably curved at its ends to make the opposing faces thereof concave and the outer faces thereof convex, I do not wish to be limited to the employment of curves as the side edges of the support may be otherwise flared to realize the object of my invention.

The invention will be more fully explained by reference to the accompanying drawing in which Fig. 1 is a side view of a scale illustrating the application of my invention thereto; Fig. 2 is a rear view of the scale; Fig. 3 is a plan view showing a part of the scale pan, the U-shaped support for the scale pan, and the strut between the sides of this support; Fig. 4 is a sectional view on line 4—4 of Fig. 3; Fig. 5 illustrates, in perspective, the portion of the scale pan and the upper portion of the supporting structure for the scale pan in separated relation; Fig. 6 is a sectional view on line 6—6 of Fig. 4 on a larger scale; and Fig. 7 illustrates, in perspective, one of the support sides and the strut in separated relation and as the strut would appear before its assembly with the support.

Like parts are indicated by similar characters of reference throughout the different figures.

The scale illustrated includes the casing 1, the dial 2 and any suitable mechanism within the casing for weighing the object placed upon the scale pan 3. The scale pan is mounted upon a support 4 which is suitably assembled with the interior mechanism of the scale to enable the weight of the object placed upon the scale pan to actuate the pointer that is before the scale dial. The support 4 is of U-shape and is made of strip metal curved or otherwise bent in a transverse direction at each end of the support to make the opposing faces of the ends of the support concave and the outer faces of the support convex. The strut 5 is also of strip metal and is formed at each end with a projection 6 received in the adjacent cavity of the support, this projection and the cavity conforming in shape. Horns 7 are provided on each side of each projection 6. The base portions of these horns enter the notches 8 that are formed in the opposed edges of each end of the support 4. These horns are bent over the convex faces of the support whereby the strut and support are firmly clinched in assembly.

Threaded holes 9 are provided at each end of the strut and are co-axial with the cavities in the sides of the support 4. The scale pan 10 is formed with holes 11 that are aligned with the holes 9. Screws 12 are passed through the holes 11 into the holes 9. Ridges 13 desirably surround the holes 9, these ridges conforming in shape to the convex faces of the ends of the support 4 to take part in positioning the scale pan and co-operating with the screws 12 in securing a very rigid relation of the scale pan and support.

While I have herein shown and particularly described the preferred embodiment of my invention I do not wish to be limited to the precise details of construction shown as changes may readily be made without departing from the spirit of my invention but having thus described my invention I claim as new and desire to secure by Letters Patent the following:—

1. A joint including a strip bent in a transverse direction to be concave on one side and convex on the other and having opposite notches, one at each edge; a second strip having a projection at one end received in the cavity of the first to which this projection conforms in shape, the second strip also having horns, one on each side of its said projection, which enter the notches in the first strip and are inwardly bent over the convex face of the first strip; a plate having a hole therein in register with a hole that is formed at the projection in the second strip, the plate being formed with a ridge shaped to fit the convex side of the first strip; and an assembling member in said holes and in holding relation to the strips.

2. A joint including a strip bent in a transverse direction to be concave on one side and convex on the other and having opposite notches, one at each edge; a second strip having a projection at one end received in the cavity of the first to which this projection conforms in shape, the second strip also having horns, one on each side of its said projection, which enter the notches in the first strip and are inwardly bent over the convex face of the first strip; and a plate having a hole therein in register with a hole that is formed at the projection in the second strip, the plate being formed with a ridge shaped to fit the convex side of the first strip.

3. A joint including a strip bent in a transverse direction to be concave on one side and convex on the other and having opposite notches, one at each edge; a second strip having horns, one on each side, which enter the notches in the first strip and are inwardly bent over the convex face of the first strip; a plate having a hole therein in register with a hole that is formed in the second strip, the plate being formed with a ridge shaped to fit the convex side of the first strip; and an assembling member in said holes and in holding relation to the strips.

4. A joint including a strip bent in a transverse direction to be concave on one side and convex on the other and having opposite notches, one at each edge; a second strip having horns, one on each side, which enter the notches in the first strip and are inwardly bent over the convex face of the first strip; and a plate having a hole therein in register with a hole that is formed in the second strip, the plate being formed with a ridge shaped to fit the convex side of the first strip.

5. A joint including a strip bent in a transverse direction to be concave on one side and convex on the other and having opposite notches, one at each edge; a second strip having a projection at one end received in the cavity of the first to which this projection conforms in shape, the second strip also having horns, one on each side of its said projection, which enter the notches in the first strip and are inwardly bent over the convex face of the first strip; a plate having a hole therein in register with a hole that is formed at the projection in the second strip, the plate being formed with a ridge fitting the end of the first strip; and an assembling member in said holes and in holding relation to the strips.

6. A joint including a strip bent in a transverse direction to be concave on one side and convex on the other and having opposite notches, one at each edge; a second strip having a projection at one end received in the cavity of the first to which this projection conforms in shape, the second strip also having horns, one on each side of its said projection, which enter the notches in the first strip and are inwardly bent over the convex face of the first strip; and a plate having a hole therein in register with a hole that is formed at the projection in the second strip, the plate being formed with a ridge fitting the end of the first strip.

7. A joint including a strip bent in a transverse direction to be concave on one side and convex on the other and having opposite notches, one at each edge; a second strip having horns, one on each side, which enter the notches in the first strip and are inwardly bent over the convex face of the first strip; a plate having a hole therein in register with a hole that is formed in the second strip, the plate being formed with a ridge fitting the end of the first strip; and an assembling member in said holes and in holding relation to the strips.

8. A joint including a strip bent in a transverse direction to be concave on one side and convex on the other and having opposite notches, one at each edge; a second strip having horns, one on each side, which enter the notches in the first strip and are inwardly bent over the convex face of the first strip; and a plate having a hole therein in register with a hole that is formed in the second strip, the plate being formed with a ridge fitting the end of the first strip.

9. A joint including a strip bent in a transverse direction to be concave on one side and convex on the other; a second strip having a projection at one end received in the cavity of the first to which this projection conforms in shape; and a plate assembled with said strips and having a ridge fitting the convex side of the first strip.

10. A joint including a strip bent in a transverse direction to be concave on one side and convex on the other; a second strip abutting the concave side of the first; and a plate assembled with said strips and having a ridge fitting the convex side of the first strip.

In witness whereof, I hereunto subscribe my name this 13th day of June, A. D. 1923.

MORRIS SCHWARTZ.